US011229967B2

(12) United States Patent
Nishikawa et al.

(10) Patent No.: US 11,229,967 B2
(45) Date of Patent: Jan. 25, 2022

(54) WIRE ELECTRICAL DISCHARGE MACHINE AND PLACEMENT TIME CALCULATION METHOD

(71) Applicant: FANUC CORPORATION, Yamanashi (JP)

(72) Inventors: Ryou Nishikawa, Yamanashi-ken (JP); Shouji Takahashi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 814 days.

(21) Appl. No.: 15/708,337

(22) Filed: Sep. 19, 2017

(65) Prior Publication Data

US 2018/0079021 A1    Mar. 22, 2018

(30) Foreign Application Priority Data

Sep. 21, 2016    (JP) .............................. JP2016-183845

(51) Int. Cl.
*B23H 7/26* (2006.01)
*B23H 1/10* (2006.01)
*G05B 19/18* (2006.01)
*G05B 19/404* (2006.01)
(Continued)

(52) U.S. Cl.
CPC ................. *B23H 7/26* (2013.01); *B23H 1/10* (2013.01); *B23H 11/003* (2013.01);
(Continued)

(58) Field of Classification Search
CPC .......... B23H 7/02; B23H 7/26; B23H 11/003; B23H 1/10; G05B 19/182; G05B 19/404; G05B 2219/45221
(Continued)

(56) References Cited

U.S. PATENT DOCUMENTS 4,777,340 A    10/1988    Kobayashi et al.
6,308,108 B1 *  10/2001    Michiwaki ............. G06Q 10/06
                                                     700/195
(Continued)

FOREIGN PATENT DOCUMENTS

CN          103894885 A      7/2014
DE      112011105607 T5     12/2014
(Continued)

OTHER PUBLICATIONS

Extended European Search Report dated Jan. 29, 2018 for related EP Application No. 17001560.6, 10 pgs.
(Continued)

*Primary Examiner* — Dana Ross
*Assistant Examiner* — Kuangyue Chen
(74) *Attorney, Agent, or Firm* — Fredrikson & Byron, P.A.

(57) ABSTRACT

A wire electrical discharge machine which performs electrical discharge machining on a workpiece, includes: a worktable on which the workpiece is placed; a placement area detector that divides the top surface of the worktable into multiple areas and detects the areas where the workpiece is placed; a placement time measuring unit that measures placement time for which the workpiece is placed on each of the areas detected by the placement area detector; and a cumulative time storage that adds up the placement times measured by the placement time measuring unit for each of the areas as a cumulative time for the area.

13 Claims, 9 Drawing Sheets

(51) Int. Cl.
B23H 11/00 (2006.01)
*B23H 7/02* (2006.01)

(52) U.S. Cl.
CPC ......... G05B 19/182 (2013.01); G05B 19/404 (2013.01); *B23H 7/02* (2013.01); *G05B 2219/45221* (2013.01)

(58) Field of Classification Search
USPC ..................................................... 219/69.12
See application file for complete search history.

(56) References Cited

U.S. PATENT DOCUMENTS

| | | | | |
|---|---|---|---|---|
| 2004/0238497 | A1* | 12/2004 | Meister | B23H 9/14 |
| | | | | 219/69.2 |
| 2013/0277335 | A1 | 10/2013 | Matsunaga et al. | |
| 2015/0088454 | A1* | 3/2015 | Sugiyama | G01B 5/008 |
| | | | | 702/155 |
| 2016/0176004 | A1* | 6/2016 | Miyaji | B23Q 15/013 |
| | | | | 700/193 |

FOREIGN PATENT DOCUMENTS

| | | |
|---|---|---|
| JP | 2004268220 A | 9/2004 |
| JP | 2013226612 A | 11/2013 |

OTHER PUBLICATIONS

English Abstract and Machine Translation for Chinese Publication No. 103894885 A, published Jul. 2, 2014, 17 pgs.
English Abstract and Machine Translation for German Publication No. 11-2011-105607 T5, published Dec. 24, 2014, 15 pgs.
English Abstract and Machine Translation for Japanese Publication No. 2004-268220 A, published Sep. 30, 2004, 7 pgs.
English Abstract for Japanese Publication No. 2013-226612 A, published Nov. 7, 2013, 2 pgs.

* cited by examiner

FIG. 4

| 58(1) | 58(2) | 58(3) | | | | | | | | | | | | | | | | | | | | | | | 54a | 54 | 58(N-1) | 58(N) |
|---|---|---|---|---|---|---|---|---|---|---|---|---|---|---|---|---|---|---|---|---|---|---|---|---|---|---|---|---|
| 0 | 100 | | | | | | | | | | | | | | | | | | | | | | | | 0 | 0 | | |
| 100 | 150 | 80 | 60 | 60 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | | |
| 60 | 120 | 120 | 100 | 80 | | | | | | | | | | | | | | | | | | | | 33 | 44 | | |
| 40 | 50 | | | | | | | | | | | | | | | | | | | | | | | | 2 | 33 | | |
| 10 | 20 | | | | | | | | | | | | | | | | | | | | | | | | 0 | 44 | | |
| 10 | 20 | | | | | | | | | | | | | | | | | | | | | | | | 4 | 100 | 0 | 0 |
| 2 | 2 | | | | | | | | | | | | | | | | | | | | | | | | 3 | 150 | 0 | 0 |
| 2 | 2 | | | | | | | | | | | | | | | | | | | | | | | | 6 | 100 | 0 | 0 |
| 2 | 2 | | | | | | | | | | | | | | | | | | | | | | | | 5 | 20 | 0 | 0 |
| 3 | 3 | | | | | | | | | | | | | | | | | | | | | | | | 3 | 10 | 0 | 2 |
| 10 | 20 | | | | | | | | | | | | | | | | | | | | | | | | 4 | 5 | 1 | 2 |
| 20 | 40 | | | | | | | | | | | | | | | | | | | | | | | | 4 | 5 | 0 | 5 |
| 10 | 20 | | | | | | | | | | | | | | | | | | | | | | | | 3 | 10 | 0 | 5 |
| 76 | 96 | | | | | | | | | | | | | | | | | | | | | | | | 4 | 10 | 0 | 10 |
| 121 | 159 | | | | | | | | | | | | | | | | | | | | | | | | 4 | 20 | 0 | 10 |
| 134 | 215 | | | | | | | | | | | | | | | | | | | | | | | | 3 | 30 | 0 | 20 |
| 140 | 435 | | | | | | | | | | | | | | | | | | | | | | | | 4 | 50 | 0 | 100 |
| 274 | 584 | | | | | | | | | | | | | | | | | | | | | | | | 0 | 130 | 0 | 120 |
| 256 | 658 | | | | | | | | | | | | | | | | | | | | | | | | 0 | 150 | 0 | 140 |
| 253 | 754 | 753 | 550 | 450 | 341 | 300 | 323 | 321 | 298 | 213 | 153 | 60 | 20 | 20 | 80 | 120 | 160 | 180 | 180 | 190 | 210 | 220 | 210 |
| 314 | 756 | 534 | 441 | 323 | 252 | 384 | 325 | 120 | 153 | 201 | 123 | 55 | 44 | 35 | 25 | 65 | 85 | 160 | 170 | 180 | 200 | |
| 100 | 653 | | | | | | | | | | | | | | | | | | | 180 | 22 | | |

| STATE | COEFFICIENT |
|---|---|
| PLACEMENT STAGE | 1 |
| FLUID FILLING STAGE | 1.1 |
| MACHINING STAGE | 1.5 |
| UNLOADING STAGE | 1.4 |

WIRE ELECTRICAL DISCHARGE MACHINE AND PLACEMENT TIME CALCULATION METHOD

CROSS-REFERENCE TO RELATED APPLICATION

This application is based upon and claims the benefit of priority from Japanese Patent Application No. 2016-183845 filed on Sep. 21, 2016, the contents of which are incorporated herein by reference.

BACKGROUND OF THE INVENTION

Field of the Invention

The present invention relates to a wire electrical discharge machine for machining a workpiece using wire electrodes and a placement time calculation method of calculating cumulative time for which workpieces have been placed on a worktable.

Description of the Related Art

Japanese Laid-Open Patent Publication No. 2013-226612 discloses a worktable (movable table) on which workpieces (objects to be machined) are placed is moved by a servomotor.

SUMMARY OF THE INVENTION

The surface (top surface) of the worktable on which an object to be processed (workpiece) is placed is formed so that the flatness and the parallelism with respect to the X-axis direction and the Y-axis direction, along which the worktable moves are less a predetermined value. Also, the assembly accuracy of the wire electrical discharge machine inclusive of the top surface of the worktable also satisfies a predetermined level. However, as the workpieces contact the top surface of the worktable, the upper surface of the worktable wears. Therefore, if workpieces are repeatedly placed in the same position on the top surface of the worktable, there occurs the problem that the flatness and the parallelism of the top surface of the worktable deteriorate soon.

The present invention has been devised in order to solve the above problem, it is therefore an object of the present invention to provide a wire electrical discharge machine capable of suppressing degradation of the flatness and parallelism of the top surface of the worktable.

One aspect of the present invention resides in a wire electrical discharge machine which generates electric discharge at an electrode gap between a wire electrode and a workpiece by applying voltage across the electrode gap to perform electrical discharge machining on the workpiece, comprising: a worktable on which the workpiece is present; a placement area detector configured to divide the top surface of the worktable into a plurality of areas and detect the areas where the workpiece is placed; a placement time measuring unit configured to measure placement time for which the workpiece is placed on each of the areas detected by the placement area detector; and a cumulative time storage configured to add up the placement times measured by the placement time measuring unit for each of the areas as a cumulative time for the area.

According to this configuration, since the operator can set the workpiece on the upper surface of the worktable in areas where the cumulative time of the workpiece placement time is short, it is possible to retard deterioration of the flatness and parallelism (which will be also referred to, hereinbelow, as accuracy) of the top surface of the worktable.

The wire electrical discharge machine may further include a display unit that displays the cumulative time for each of the areas. Since this configuration makes the operator to set the workpiece on the upper surface of the worktable in areas where the cumulative time of the workpiece placement time is short, it is possible to retard accuracy deterioration of the top surface of the worktable.

The display unit may display the cumulative times with a graph. This enables the operator to intuitively grasp the cumulative time for which workpieces W have been placed on the worktable.

The wire electrical discharge machine may further include a display unit for displaying the distribution of the areas the cumulative time of which with respect to an average of the cumulative times is smaller than a first predetermined ratio. Since this configuration makes the operator to set the workpiece on the upper surface of the worktable in areas where the cumulative time of the workpiece placement time is short, it is possible to retard accuracy deterioration of the top surface of the worktable.

The wire electrical discharge machine may further include a notification unit, which when the workpiece is placed in the area the cumulative time of which with respect to the cumulative times is larger than a second predetermined ratio, notifies accordingly. When notified by the notification unit, the operator can recognize that he/she is placing the workpiece in the areas the cumulative time of which is long. As a result, the operator can place the workpiece on the worktable avoiding the areas the cumulative time of which is long, hence it is possible to delay accuracy deterioration of the top surface of the worktable.

The wire electrical discharge machine may further include a notification unit, which when the maximum value, the average value, or the minimum value of the cumulative times becomes equal to or greater than a predetermined value, notifies accordingly. This enables the operator to perform maintenance work such as polishing the top surface of the worktable and prevent accuracy deterioration of the worktable.

The placement time measuring unit may correct the placement time according to the state of the wire electrical discharge machine. This makes it possible to calculate the cumulative time that can reflect the extent of wear of the worktable.

In the wire electrical discharge machine, the worktable is provided inside a work tank in which a working fluid is stored. When a state in which placement work of the workpiece on the worktable is being performed is named a placement stage, a state in which the work tank is being filled with the working fluid is named a fluid filling stage, a state in which the workpiece is being subjected to electrical discharge machining is named a machining stage, and states in which the working fluid is drained from the work tank and the workpiece is taken out from the worktable are named an unloading stage, the placement time measuring unit may measure elapsed time for which the workpiece is being placed on each of the areas detected by the placement area detector, individually in each of the placement stage, the fluid filling stage, the machining stage and the unloading stage and corrects the measured times for the placement stage, the fluid filling stage, the machining stage and the unloading stage, separately and add up the corrected times to output the sum as the effective placement time. This makes it possible to calculate the placement time that can reflect the extent of wear of the worktable.

The placement area detector may include an imaging unit that images the top surface of the worktable and determine the areas where the workpiece is placed from the image captured by the imaging unit. This configuration makes it possible to determine exact areas where the workpiece is present.

In the wire electrical discharge machine, the worktable is provided inside a work tank in which a working fluid is stored. The placement time measuring unit may measure the placement time on the assumption that the workpiece remains in the same areas where the workpiece has been placed right before the working fluid is supplied to the work tank. As a result, even when the work tank is filled with the working fluid and thus the imaging unit cannot capture the image of the top surface of the worktable, it is possible to measure the placement time for which the workpiece is present on the areas.

The placement area detector may include a load sensor that detects load acting on the top surface of the worktable and determine the areas where the workpiece is placed from the load detected by the load sensor. This configuration makes it possible to determine exact areas where the workpiece is present.

The placement area detector may include ampere meters that detect currents flowing through the worktable and determine the areas where the workpiece is placed from the currents detected by the ampere meters. This configuration makes it possible to determine exact areas where the workpiece is placed.

According to the present invention, it is possible to suppress accuracy deterioration of the top surface of the worktable.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing an example of cumulative time for which workpieces have been placed on a worktable, the cumulative time being calculated by the control device of the first embodiment;

FIG. 6 is a table showing an example of coefficients by which the placement time according to the first embodiment is multiplied;

DESCRIPTION OF THE PREFERRED EMBODIMENTS

A wire electrical discharge machine 10 according to the present invention will be described in detail hereinbelow by illustrating preferred embodiments with reference to the accompanying drawings.

First Embodiment

[Overall Configuration of Wire Electrical Discharge Machine]

Figure 1:
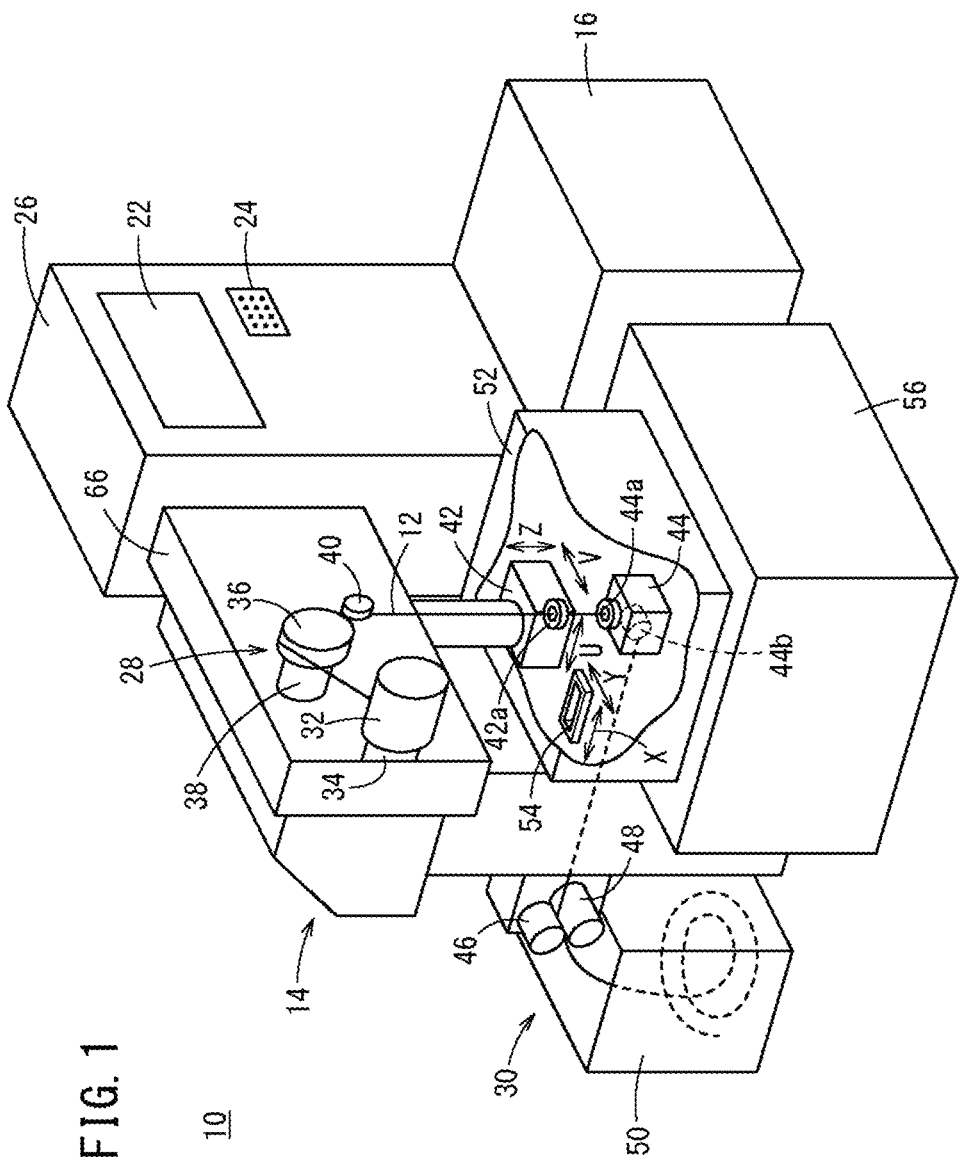
FIG. 1 is a mechanical schematic configuration diagram of a wire electrical discharge machine according to the first embodiment.
Figure 2:
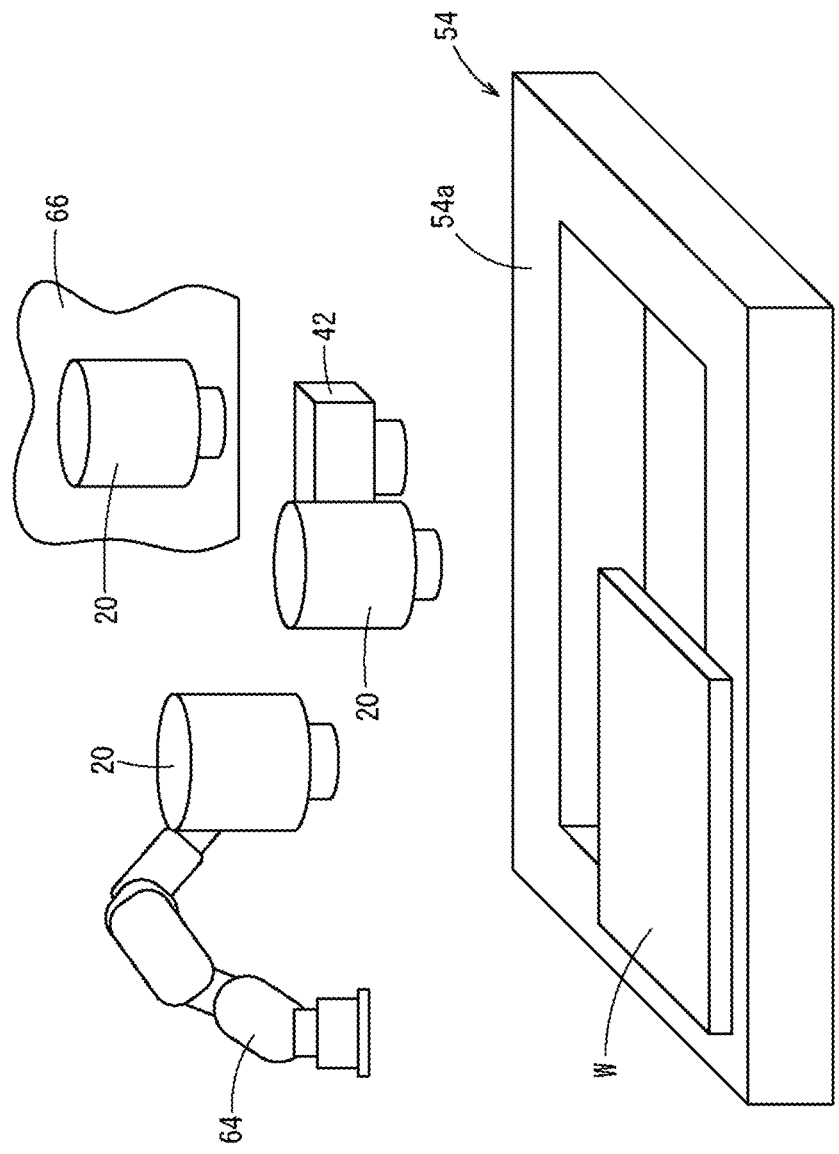
FIG. 2 is a diagram illustrating an example of a position at which a camera is attached to the wire electrical discharge machine of the first embodiment.

FIG. 1 is a mechanical schematic configuration diagram of the wire electrical discharge machine 10. FIG. 2 is a diagram illustrating an example of a position at which a camera 20 is attached to the wire electrical discharge machine 10.

The wire electrical discharge machine 10 generates electric discharge by applying voltage across an electrode gap (clearance) formed between a wire electrode 12 and an object to be machined (workpiece) W in a working fluid, so as to perform machining (electrical discharge machining) on the workpiece W. The wire electrical discharge machine 10 includes a main machine body 14, a working fluid processor (dielectric fluid unit) 16, a camera (imaging unit) 20, a display device (display unit) 22, a notification device (notifying unit) 24, and a control device 26.

The wire electrode 12 is formed of, for example, metal material such as tungsten-based, copper-alloy based, and brass-based material. On the other hand, the material of the workpiece W is, for example, metal material such as iron-based material or superhard material (tungsten carbide).

The main machine body 14 includes a supply system 28 for supplying the wire electrode 12 toward the workpiece W and a collection system 30 for collecting the wire electrode 12 having passed through the workpiece W.

The supply system 28 includes a wire bobbin 32 with the wire electrode 12 wound thereon, a torque motor 34 for applying a torque to the wire bobbin 32, a brake roller 36 for applying a braking force of friction to the wire electrode 12, a braking motor 38 for applying a braking torque to the brake roller 36, a pinch roller 40 for gripping the wire electrode 12 between the pinch roller and the brake roller 36, and a wire guide (upper wire guide) 42 for guiding the wire electrode 12 above the workpiece W. The supply system 28 is disposed at an upper mechanical part 66 of the main machine body 14.

The collection system 30 includes a wire guide (lower wire guide) 44 for guiding the wire electrode 12 below the workpiece W, a pinch roller 46 and a feed roller 48 capable of gripping the wire electrode 12, and a wire collection box 50 for collecting the wire electrode 12 transferred by the pinch roller 46 and feed roller 48.

The main machine body 14 includes a work tank 52 capable of storing a working fluid such as deionized water and oil etc., which is used in electrical discharge machining. The wire guides 42 and 44 are arranged in the work tank 52. Also arranged inside the work tank 52 is a worktable 54 on which a workpiece W is placed. The worktable 54 is arranged so as to be moved by an unillustrated servomotor in the X-direction and Y-direction which is orthogonal to the X-direction. The worktable 54 is given in a rectangular frame-like form.

The work tank 52 is mounted on a base portion 56. The workpiece W is placed between the wire guide 42 and the wire guide 44. The wire guides 42 and 44 have respective die guides 42a and 44a for supporting the wire electrode 12. The wire guide 42 can be moved by unillustrated servomotors or the like along the Z-axis perpendicular to the XY-plane, a U-axis parallel to the X-axis, and a V-axis parallel to the Y-axis and can tilt the wire electrode 12 with respect to the Z-axis. Further, the wire guide 44 includes a guide roller 44b that guides the wire electrode 12 to the pinch roller 46 and the feed roller 48 changing the direction of travel of the wire electrode 12.

In addition, the upper wire guide 42 ejects a clean working fluid not containing sludge (swarf). This function makes it possible to fill the clearance (electrode gap) between the wire electrode 12 and the workpiece W with a clean working fluid suitable for electrical discharge machining, and also prevent the accuracy of electrical discharge machining from being deteriorated by sludge generated during electrical discharge machining. The lower wire guide 44 may also eject a clean working liquid not containing sludge. The wire guides 42 and 44, the workpiece W and the worktable 54 are immersed in the working fluid stored in the work tank 52.

Herein, the workpiece W is formed with a start hole or machining slot (neither shown) from which electrical discharge machining is started, and the wire electrode 12 is inserted through the start hole or the machining slot and is wire-fed. The gap between the start hole or the machining slot of the workpiece W and the wire electrode 12 forms the electrode gap. After the wire electrode 12 is passed through the start hole or the machining slot and wire-fed, the wire electrical discharge machine 10, while sending out the wire electrode 12 toward the workpiece W in the downward direction, moves the worktable 54 (the workpiece W) along a plane parallel to the XY-plane, to thereby machine the workpiece W. Wire feeding of the wire electrode 12 means that the wire electrode 12 wound on the wire bobbin 32 is passed through the wire guide 42, the workpiece W, and the wire guide 44, and gripped between the pinch roller 46 and the feed roller 48. When the wire electrode 12 is wire-fed, a predetermined tension is being applied to the wire electrode 12.

The working fluid processor 16 is a device that removes sludge produced in the work tank 52 and manages the quality of the working fluid by adjusting the electric resistivity and temperature and the like. The working fluid that has been adjusted in fluid quality by the working fluid processor 16 is returned to the work tank 52 again.

A camera 20 is disposed above the worktable 54. The camera 20 is provided so as to image the entire top surface, designated at 54a, of the worktable 54. The mounting position of the camera 20 is not particularly limited as long as the camera 20 can take the whole of the top surface 54a of the worktable 54. For example, as shown in FIG. 2 the camera 20 may be attached to the upper mechanical part 66. Alternatively, the camera may be attached to the wire guide 42. Further, the camera 20 may be attached to a robot arm 64 that can move the position of the camera.

The display device 22 displays the state of electrical discharge machining, the placement time for which the workpiece W is set on the worktable 54 and the like. The notification device 24 is a speaker that informs the operator by sound or voice. The display device 22 and the notification device 24 are controlled by the control device 26.

[Configuration of Control Apparatus]

Figure 3:
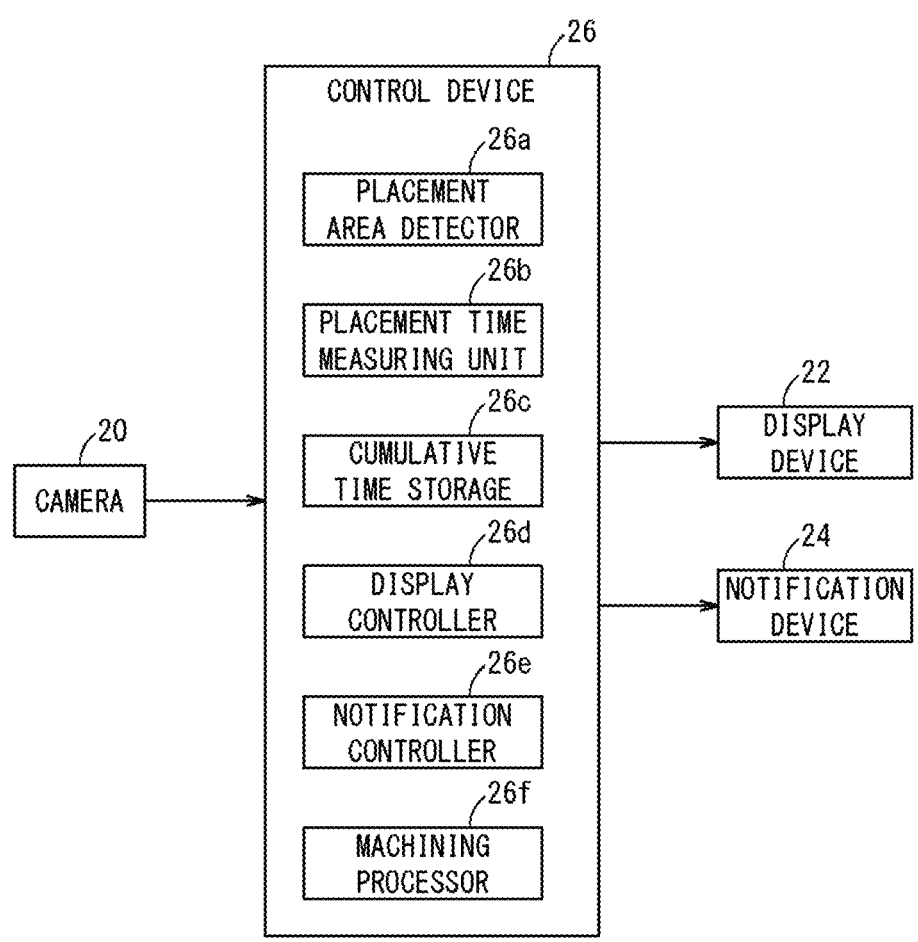
FIG. 3 is a control block diagram showing a configuration of a control device according to the first embodiment.

FIG. 3 is a control block diagram showing the configuration of the control device 26. FIG. 4 is a diagram showing an example of cumulative time, calculated by the control device 26, during which the workpiece W is set on the worktable 54. The control device 26 calculates the placement time during which the workpiece W is set on the top surface 54a of the worktable 54. The control device 26 receives an image of the top surface 54a of the worktable 54 captured by the camera 20 and outputs a control signal to the display device 22 and the notification device 24. The control device 26 includes a placement area detector 26a, a placement time measuring unit 26b, a cumulative time storage 26c, a display controller 26d, a notification controller 26e and a machining processor 26f.

The placement area detector 26a detects at which position on the top surface 54a of the worktable 54 the workpiece W is placed. As shown in FIG. 4, the placement area detector 26a divides the top surface 54a of the worktable 54 into N (multiple) areas 58 (1) to 58(N) and detects in each of the areas 58 (1) to 58(N) whether or not the workpiece W is placed. In FIG. 4, reference numerals 58(4) to 58(N−2) are omitted. In the following description, areas 58(1) to 58(N) will not be specified but will be generally mentioned as areas 58. The placement area detector 26a finds the areas 58 in which the workpiece W is placed, from the image of the top surface 54a of the worktable 54 captured by the camera 20.

The placement time measuring unit 26b measures the time (placement time) during which the workpiece W is placed, for each of the areas 58 in which the workpiece W is detected by the placement area detector 26a.

The cumulative time storage 26c accumulates for each area 58 the placement time obtained by the placement time measuring unit 26b and stores the result as the cumulative time.

The display controller 26d outputs control signals to the display device 22. The display device 22 displays the cumulative time for every area 58 according to the received control signals. The display controller 26d reads the cumulative time for each area 58 stored in the cumulative time storage 26c. The display controller 26d displays on the display device 22 a diagram showing the areas 58 on the top surface 54a of the worktable 54 as shown in FIG. 4. In this figure, each area 58 is displayed with a cumulative time expressed by numbers.

In addition, the display controller 26d controls the display device 22 so as to display short cumulative times with, for example, blue numerals, long cumulative times with red numerals, and other cumulative times with black numerals. As a result, the operator can intuitively recognize regions where areas 58 with short cumulative placement time are densely distributed and regions where areas 58 with long cumulative placement time are densely distributed.

The display controller 26d determines that the cumulative time is long or short as follows. The display controller 26d calculates an average cumulative time by dividing the sum of the cumulative times of all the areas 58(1) to 58(N) by N. The display controller 26d decides that a cumulative time is short if the ratio of the cumulative time to the average is smaller than a first predetermined ratio (e.g., 50%). The display controller 26d decides that a cumulative time is long if the ratio of the cumulative time to the average is greater than a second predetermined ratio (e.g., 150%).

The notification controller 26e outputs control signals to the notification device 24. In accordance with the received control signal, the notification device 24 gives a notice that the cumulative time of the areas 58 where the workpiece W is placed is long, when this is the case. The notification controller 26e receives information on areas 58 where the workpiece W is placed, from the placement area detector 26a. In addition, the notification controller 26e reads the cumulative time for every area 58 stored in the cumulative time storage 26c. The notification controller 26e controls the notification device 24 to notify an operator that the cumulative time of the areas 58 where the workpiece W is placed is long, when this is the case. The notification controller 26e determines whether or not the cumulative time is long in the same manner as the display controller 26d does.

Further, when the maximum of the cumulative times of all the areas 58 reaches a predetermined value or greater according to the received control signal, the notifying device 24 notifies the operator accordingly. The notification controller 26e reads the cumulative time for each area 58 stored in the cumulative time storage 26c. When the maximum of the cumulative times for all the areas 58 reaches a predetermined value or greater, the notification controller 26e controls the notification device 24 to notify the operator accordingly. The predetermined value is set at a period of time that would cause accuracy deterioration of the top surface 54a of the worktable 54 and require maintenance such as polishing the top surface 54a of the worktable 54.

The machining processor 26f controls electrical discharge machining performed by the wire electrical discharge machine 10. The wire electrical discharge machine 10 performs machining on the workpiece W through four stages including a mounting stage, a fluid filling stage, a machining stage, and an unloading stage. The mounting stage involves placement of the workpiece W on the worktable 54 by an operator, robot, or the like and mounting operations (workpiece setting operations) such as parallel adjustment and alignment adjustment. The fluid filling stage is the duration from the start of supplying the working fluid to the work tank 52 after the mounting is completed until the end of the filling of the working fluid. The machining stage is the duration from the start of electrical discharging on the workpiece W in the working fluid until the end of electrical discharging on the workpiece W. The unloading stage is the duration from the drainage of the working fluid from the work tank 52 until the workpiece W is taken out from the worktable 54 by the operator, robot or, any other means. These stages are controlled by the machining processor 26f.

[Placement Time Measurement Processing]

Figure 5:
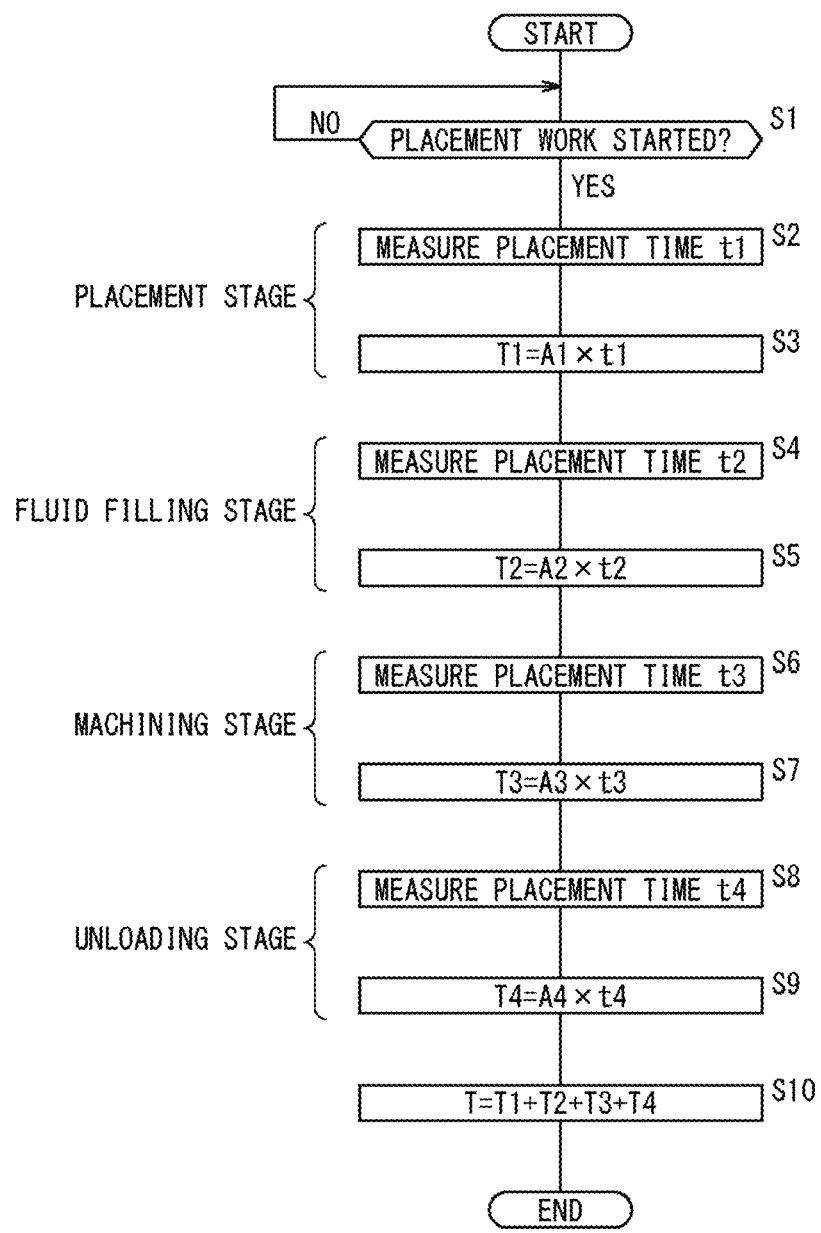
FIG. 5 is a flowchart showing a flow of a measurement process of measuring placement time by a placement time measuring unit according to the first embodiment.

FIG. 5 is a flowchart showing the flow of a placement time measurement process performed by the placement time measuring unit 26b. FIG. 6 is a table showing an example of coefficients by which the placement time is multiplied. The placement time measuring unit 26b receives signals indicating the stages (mounting stage, fluid filling stage, machining stage, unloading stage) of the wire electrical discharge machine 10, from the machining processor 26f, and measures the placement time for each stage.

At step S1, the placement time measuring unit 26b determines whether or not a signal indicating that the start of the mounting operation is sent from the machining processor 26f, and when the mounting operation has been started, the control goes to step S2 and when the mounting operator has not been started, the control stays at and repeats step S1.

At step S2, the placement time measuring unit 26b measures placement time (denoted as t1 in FIG. 5) in the mounting stage. The placement time measuring unit 26b measures placement time in each of the areas 58 in which the workpiece W is detected by the placement area detector 26a. The placement time measuring unit 26b continues to measure the placement time until the mounting stage is ended.

When the mounting stage ends, at step S3 the placement time measuring unit 26b multiplies the placement time measured at step S2 by the coefficient A1 to produce an effective placement time T1 for the mounting stage. The coefficient A1 for the mounting stage is set at "1" as shown in FIG. 6.

At step S4, the placement time measuring unit 26b measures placement time (denoted as t2 in FIG. 5) in the fluid filling stage. The placement time measuring unit 26b measures placement time on the assumption that even in the fluid filling stage, the workpiece W remains in the same areas 58 where the workpiece W has been mounted right before the working fluid is supplied to the work tank 52. The placement time measuring unit 26b continues to measure placement time until the fluid filling stage ends.

When the fluid filling stage ends, at step S5 the placement time measuring unit 26b calculates a value by multiplying the placement time measured at step S4 by a coefficient A2 to obtain an effective placement time T2 for the fluid filling stage. The coefficient A2 for the fluid filling stage is set at "1.1" as shown in FIG. 6.

At step S6, the placement time measuring unit 26b measures placement time (denoted as t3 in FIG. 5) in the machining stage. The placement time measuring unit 26b measures placement time on the assumption that even in the fluid filling stage, the workpiece W remains in the same areas 58 where the workpiece W has been mounted right before the working fluid is supplied to the work tank 52. The placement time measuring unit 26b continues to measure placement time until the machining stage ends.

When the machining stage ends, at step S7 the placement time measuring unit 26b calculates a value by multiplying the placement time measured at step S6 by a coefficient A3 to obtain an effective placement time T3 for the machining stage. The coefficient A3 for the machining stage is set at "1.5" as shown in FIG. 6.

At step S8, the placement time measuring unit 26b measures placement time (denoted as t4 in FIG. 5) in the unloading stage. The placement time measuring unit 26b measures placement time on the assumption that until the working fluid is completely drained from the work tank 52 at the unloading stage, the workpiece W remains, even in the fluid filling stage, in the same areas 58 where the workpiece W has been mounted right before the working fluid is supplied to the work tank 52. After the working fluid is completely discharged from the work tank 52 in the unloading stage, the placement time measuring unit 26b measures placement time on the areas 58 where the workpiece W is detected by the placement area detector 26a. The placement time measuring unit 26b continues to measure placement time until the unloading stage ends.

When the unloading stage ends, at step S9 the placement time measuring unit 26b calculates a value by multiplying the placement time measured at step S8 by a coefficient A4 to obtain an effective placement time T4 for the unloading stage. The coefficient A4 for the unloading stage is set at "1.4" as shown in FIG. 6.

At step S10, the placement time measuring unit 26b calculates the sum of the placement time T1 for the mounting stage, the placement time T2 for the fluid filling stage, the placement time T3 for the machining stage, and the placement time T4 for the unloading stage, and sets the sum as the total placement time (denoted by T in FIG. 5).

The placement time measuring unit 26b performs the procedure at step S4 after the procedure at step S3, the procedure at step S6 after the procedure at step S5, and the procedure at step S8 after the procedure at step S7, but the procedures at steps S3 and S4, the procedures at steps S5 and S6, and the procedures at steps S7 and S8 may be performed simultaneously. Further, the placement time t1 in the mounting stage, the placement time t2 in the fluid filling stage, the placement time t3 in the machining stage, and the placement time t4 in the unloading stage may be temporarily stored so that each placement time is multiplied by a corresponding coefficient after the end of the unloading stage.

At steps S4, S6 and S8, the placement time measuring unit 26b measures placement time on the assumption that even in the fluid filling stage, the workpiece W remains in the same areas 58 where the workpiece W has been mounted right before the working fluid is supplied to the work tank 52. This is because when the work tank 52 is filled with the working fluid, the worktable 54 is immersed in the working fluid and thus the camera 20 cannot image the top surface 54a of the worktable 54, hence the placement area detector 26a cannot detect the areas 58 where the workpiece W is placed. When the working fluid is stored in the work tank 52, the workpiece W is fixed to the worktable 54 and the workpiece W does not move with respect to the worktable 54. This is the reason why the placement time measuring unit 26b can measure placement time on the assumption that even in the fluid filling stage, the workpiece W remains in the same areas 58 where the workpiece W has been placed just before the working fluid is supplied to the work tank 52.

The coefficient by which the placement time is multiplied is determined in accordance with the state of the wire electrical discharge machine 10, i.e. depending on the progress of wear of the worktable 54. The progress of wear of the worktable 54 is different depending on the state of the wire electrical discharge machine 10. For example, when the wire electrical discharge machine 10 is in the machining stage, the workpiece W is pressed by electrical discharge machining, so that the worktable 54 receives force from the workpiece W. Therefore, in the machining stage, the wear rate of the top surface 54a of the worktable 54 is faster than the mounting stage and the fluid filling stage. When the wire electrical discharge machine 10 is in the unloading stage, the workpiece W is moved on the surface of worktable 54 while sludge is present around the workpiece W. For this reason, in the unloading stage, the top surface 54a of the worktable 54 wears faster in the unloading stage than in the mounting stage and in fluid filling stage. Thus, correcting the placement time depending on the stages of the wire electrical discharge machine 10 makes it possible to obtain the effective placement time that can reflect the actual wear of the worktable 54.

Operation and Effect

The top surface 54a of the worktable 54 is formed so that the flatness and parallelism with respect to the X-axis direction and the Y-axis direction are equal to or lower than predetermined levels. In addition, the wire electrical discharge machine 10 inclusive of the top surface 54a of the worktable 54 is assembled within a predetermined assembling accuracy. However, as the workpiece W contacts the top surface 54a of the worktable 54, the top surface 54a of the worktable 54 wears out. When workpieces W are repeatedly set in the same position on the top surface 54a of the worktable 54, the wear in that position proceeds and the accuracy of the top surface 54a of the worktable 54 deteriorates faster. If the accuracy of the top surface 54a of the worktable 54 degrades, it takes time to perform workpiece setting operations such as parallel adjustment, alignment adjustment, and the like when the workpiece W is mounted on the worktable 54, whereby the working efficiency lowers. Further, when the accuracy of the top surface 54a of the worktable 54 deteriorates, it is necessary to perform some work to polish the top surface 54a of the worktable 54 to increase the accuracy.

If workpieces W can be uniformly brought into contact with the top surface 54a of the worktable 54, the top surface 54a of the worktable 54 is evenly worn away, so that deterioration of accuracy of the top surface 54a of the worktable 54 can be delayed.

For this purpose, the first embodiment is configured such that the placement area detector 26a detects the areas 58 in which the workpiece W is placed on the top surface 54a of the worktable 54, the placement time measuring unit 26b measures, for each of the areas 58, the placement time for which the workpiece W has been placed, and the cumulative time storage 26c adds up the placement times for all of the area 58 to obtain the cumulative time for each of the areas 58. With this configuration, the operator can place a workpiece W on the top surface 54a of the worktable 54 avoiding the areas 58 the cumulative time of which is long. Thereby it is possible to delay accuracy deterioration of the top surface 54a of the work table 54.

In the first embodiment, the display controller 26d displays the cumulative time for each area 58 on the display device 22. This allows the operator to recognize the cumulative time, a period when a workpiece W having been placed, for every area 58 on the top surface 54a of the worktable 54. Since the operator can choose and place the workpiece W in the areas 58 having short cumulative times, it is possible to delay accuracy deterioration of the top surface 54a of the worktable 54.

In the first embodiment, the display controller 26d is configured to display guidance on the display device 22 so as to recommend placement of a workpiece W in the areas 58 the cumulative time of which with respect to the average of the cumulative times of all the areas 58 is smaller than the first predetermined ratio. As a result, the operator can place the workpiece W in the areas 58 with a shorter cumulative time on the top surface 54a of the worktable 54, and thus it is possible to delay accuracy deterioration of the top surface 54a of the worktable 54.

Further, in the first embodiment, when a workpiece W is placed in the areas 58 the cumulative time of which with respect to the average of the cumulative times of all the areas 58 is larger than a second predetermined ratio, the notification device 24 notifies the operator accordingly. When notified by the notification device 24, the operator can recognize that he/she is placing the workpiece W on the top surface 54a of the worktable 54, especially in the area 58 the cumulative time of which (a time period for which the workpiece W is lying in that area) is long. As a result, the operator can place the workpiece W on the worktable 54 avoiding the area 58 the cumulative time of which is long, hence it is possible to delay accuracy deterioration of the top surface 54a of the worktable 54.

The first embodiment is configured such that when the maximum of cumulative times for all the areas 58 where workpieces W are placed reaches a predetermined value or greater, the notification controller 26e causes the notifying device 24 to notify the operator accordingly. Accordingly, the operator can recognize degradation of the accuracy of the top surface 54a of the worktable 54. As a result, the operator can perform maintenance work such as polishing the top surface 54a of the worktable 54 and prevent accuracy deterioration of the worktable 54.

In the first embodiment, the placement time measuring unit 26b compensates the placement time according to the state of the wire electrical discharge machine 10. Specifically, the placement time measuring unit 26b corrects placement time depending on the stages of the wire electrical discharge machine 10: namely, the mounting stage; the fluid filling stage; the machining stage; and the unloading stage. As a result, it is possible to obtain the effective placement time that can reflect the extent of wear of the worktable 54.

In the first embodiment, the camera 20 for imaging the top surface 54a of the worktable 54 is provided, and the placement area detector 26a determines the area 58 where the workpiece W is lying from the image captured by the camera 20. Thereby, it is possible to accurately identify the area 58 where the workpiece W is lying.

Further, in the first embodiment, the placement time measuring unit 26b measures placement time on the assumption that even when the work tank 52 is filled with the working fluid, the workpiece W remains in the same areas 58 where the workpiece W has been mounted right before the working fluid is supplied to the work tank 52. As a result, even when the work tank 52 is filled with the working fluid so that the camera 20 cannot capture the image of the top surface 54a of the worktable 54, it is possible to measure the placement time for which the workpiece W is placed on the areas 58.

Second Embodiment

In the first embodiment, the areas 58 in which the workpiece W is lying on the top surface 54a of the worktable 54 are determined from the image of the top surface 54a of the worktable 54 captured by the camera 20. On the other hand, in the second embodiment, a strain gauge (load sensor) 60 for detecting loads acting on the top surface 54a of the worktable 54 is provided so as to determine the areas 58 in which the workpiece W is lying on the top surface 54a of the worktable 54 based on the loads detected by the strain gauge 60. Though the second embodiment will be described hereinbelow, description of the same components as those in the first embodiment will be omitted by allotting the same reference numerals.

Figure 7:
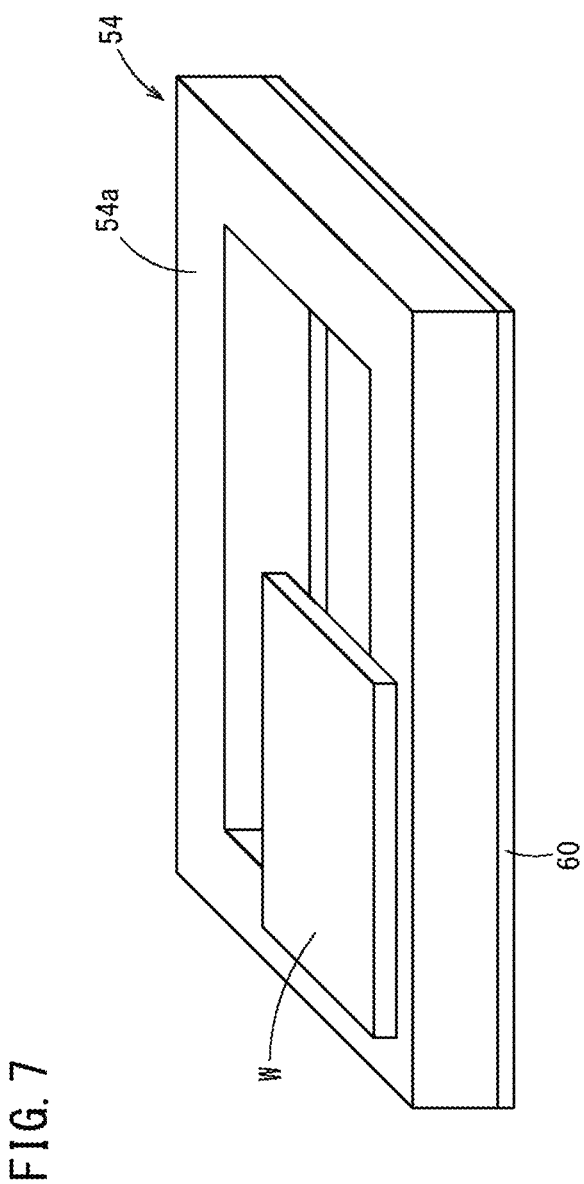
FIG. 7 is a view illustrating an example of a position where a strain gauge is attached to a wire electrical discharge machine of the second embodiment.

FIG. 7 is a view showing an example of a position where the strain gauge 60 is attached to the wire electrical discharge machine 10. The strain gauge 60 is provided on a lower portion of the worktable 54. The strain gauge 60 can detect whether or not a load acts on the top surface 54a of the worktable 54 for each area 58 of the top surface 54a of the worktable 54. When the workpiece W is placed on the top surface 54a of the worktable 54, it is detected that loads are acting on the areas 58 where the workpiece W is lying.

The placement area detector 26a determines the areas 58 in which the workpiece W is lying on the top surface 54a of the worktable 54, from the load information detected by the strain gauge 60. It should be noted that the strain gauge 60 can detect the loads acting on the top surface 54a of the worktable 54 even when the working fluid is stored in the work tank 52. Therefore, as in the first embodiment, even when the wire electrical discharge machine 10 is in the fluid filling stage, in the machining stage, and in the unloading stage, the placement area detector 26a can detect the areas 58 in which the workpiece W is lying. Thereby, even when the wire electrical discharge machine 10 is in the fluid filling stage, in the machining stage, and in the unloading stage, the placement time measuring unit 26b can measure placement time in the areas 58 where the workpiece W detected by the placement area detector 26a is lying.

Operation and Effect

In the second embodiment, the strain gauge 60 for detecting the loads acting on the top surface 54a of the worktable 54 is provided so as for the control device 26 to determine the areas 58 in which the workpiece W is lying, based on the loads detected by the strain gauge 60. Thereby, even when the wire electrical discharge machine 10 is in the fluid filling stage, in the machining stage, and in the unloading stage, the placement area detector 26a can detect the areas 58 in which the workpiece W is lying. Thus, it is possible to exactly determine the areas 58 in which the workpiece W is lying.

Third Embodiment

In the first embodiment, the areas 58 in which the workpiece W is lying on the top surface 54a of the worktable 54 are determined from the image of the top surface 54a of the worktable 54 captured by the camera 20. On the other hand, in the third embodiment, ammeters 62 for detecting the electric current flowing within the worktable 54 are arranged so as to determine the areas 58 in which the workpiece W is lying on the top surface 54a of the worktable 54 based on the electric current detected by the ammeters 62. Though the third embodiment will be described hereinbelow, description of the same components as those in the first embodiment will be omitted by allotting the same reference numerals.

Figure 8:
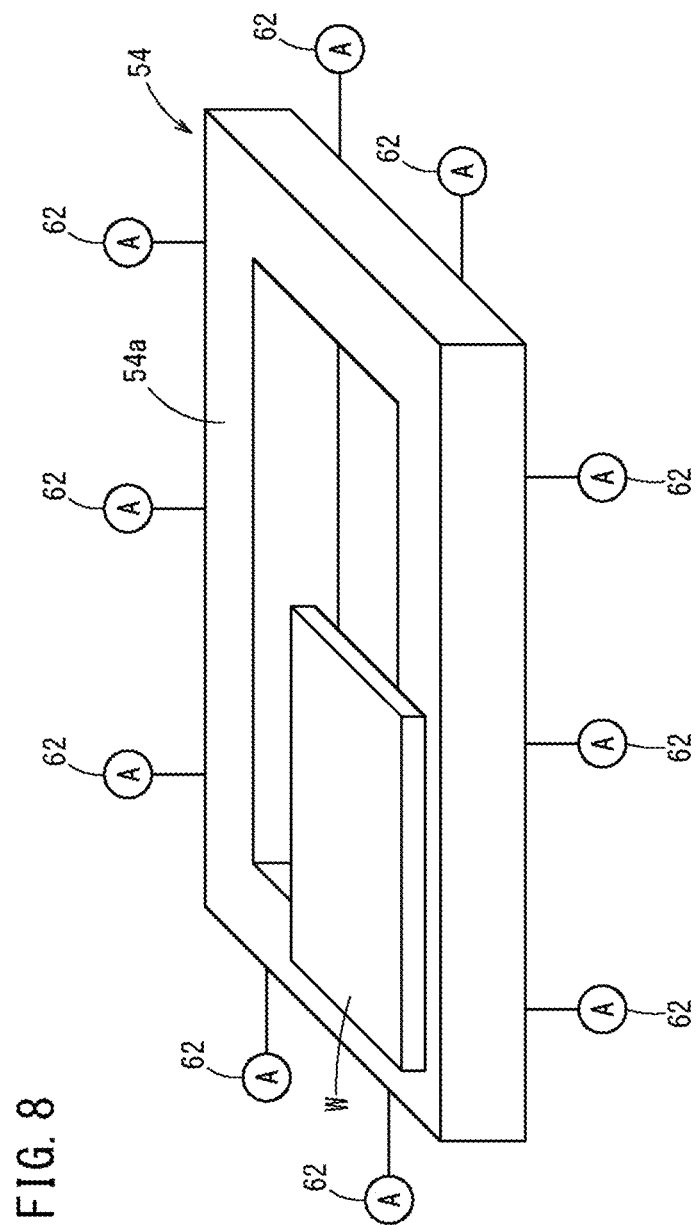
FIG. 8 is a view illustrating an example of positions at which ammeters are attached to a wire electrical discharge machine of the third embodiment.

FIG. 8 is a view illustrating a configuration in which ammeters 62 are arranged with respect to the wire electrical discharge machine 10. A plurality of ammeters 62 are provided on the worktable 54. While the workpiece W is processed by electrical discharge machining, the electric current from the wire electrode 12 to the workpiece W flows to the ground via the worktable 54. The electric current flows through the worktable 54 taking a path as shortest as possible. Therefore, in the worktable 54, an electric current value becomes higher in the areas 58 in which the workpiece W is lying than in the areas 58 where the workpiece W is not lying.

The placement area detector 26a recognizes the areas 58 at which the electric current value detected by the ammeter 62 is higher than a predetermined current value, as the areas 58 in which the workpiece W is lying. The predetermined current value is set in accordance with the strength of the electric current flowing through the worktable 54 during the electrical discharge machining.

When the electrical discharge machining is not being performed, the placement area detector 26a cannot detect areas 58 where the workpiece W is lying. Therefore, the placement time measuring unit 26b measures placement time by assuming that the workpiece W is still lying during the mounting stage, in the fluid filling stage, and in the unloading stage in the same areas 58 where the workpiece W has been present in the machining stage.

Operation and Effect

In the third embodiment, the ammeters 62 for detecting the electric current flowing through the worktable 54 are provided, and the control device 26 determines areas 58 where the workpiece W is lying from the electric current detected by the ammeters 62. Therefore, it is possible to accurately determine the areas 58 where the workpiece W is lying.

Fourth Embodiment

In the first embodiment, the display device 22 displays, using numbers, the cumulative time for each area 58 stored in the cumulative time storage 26c. On the other hand, in the fourth embodiment the display device 22 displays the cumulative time for each area 58 stored in the cumulative time storage 26c in graphical representation.

Figure 9:
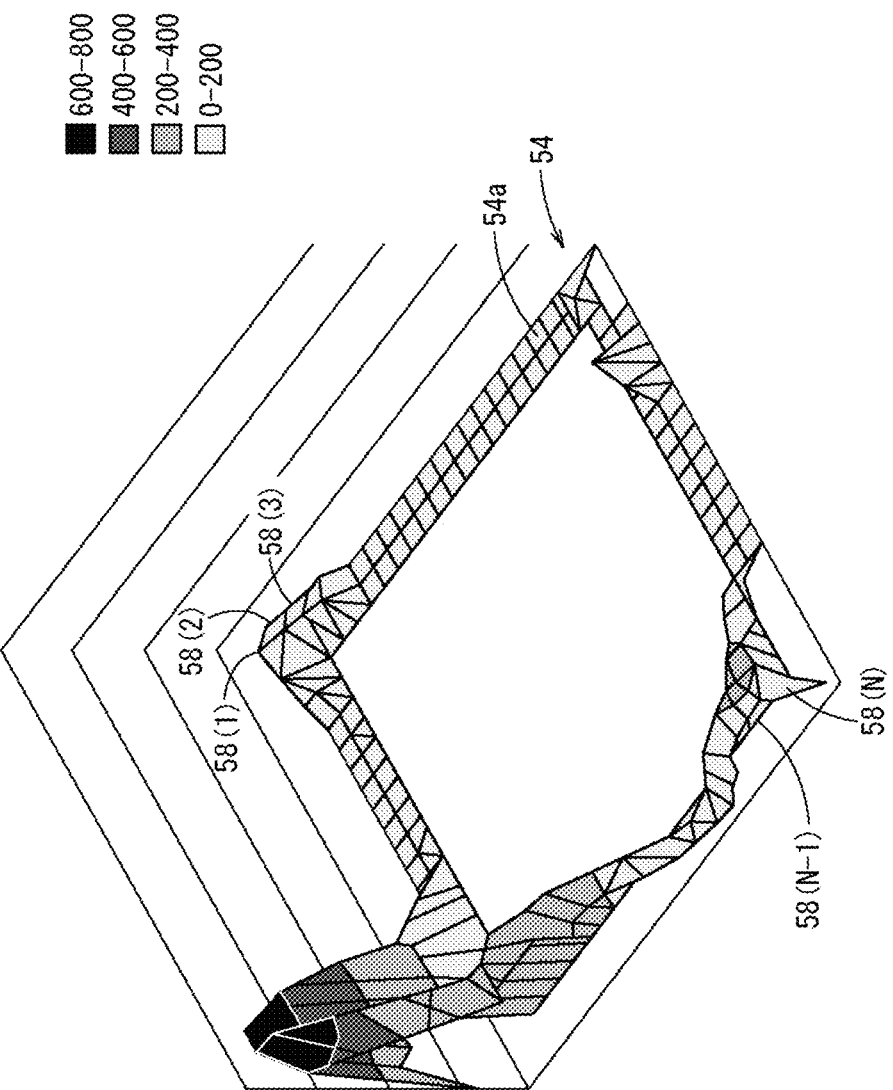
FIG. 9 is a diagram graphically showing cumulative time according to the fourth embodiment.

FIG. 9 is a diagram showing an example of graphical representation of cumulative time. As shown in FIG. 9, the display controller 26d outputs control signals to the display device 22 that order the display device 22 to display the cumulative time for every area 58 stored in the cumulative time storage 26c as a three-dimensional graph at positions corresponding to the areas 58 in a perspective view of the top surface 54a of the worktable 54. The graph indicates that the graph becomes higher as the cumulative time becomes longer.

In addition, the display controller 26d outputs control signals to the display device 22 that order the display device 22 to display the graph with different colors depending on the range of the cumulative time. For example, a cumulative time falling in a range from 0 below 200 may be shown with light blue, a cumulative time in a range from 200 below 400 with blue, a cumulative time in a range from 400 below 600 with white, and a cumulative time in a range from 600 below 800 with black.

The display of the cumulative time on the display unit 22 with the graph makes it possible to instruct the operator to set the workpiece W in the areas 58 where the cumulative time of the worktable 54 is short.

Operation and Effect

In the fourth embodiment, the display controller 26d displays the cumulative time for each area 58 on the display device 22 with the graph. Thereby, the operator can intuitively grasp the cumulative time for which workpieces W is lying on the worktable 54.

Other Embodiments

Although the present invention has been described based on the first through fourth embodiments, the specific configuration of each invention is not limited to the first to fourth embodiments, but variational designs and others that do not depart from the gist of the invention should also be included in the scope of the invention.

In the first embodiment, when the maximum value of the cumulative times of placement of workpieces W on areas 58 reaches or exceeds the predetermined value, the notification controller 26e notifies the operator accordingly by sending out a control signal to the notification device 24. For example, this configuration may be changed so that when the average of the cumulative times of placement of workpieces W on areas 58 becomes equal to or greater than the predetermined value, the notification controller 26e notifies the operator accordingly by sending out a control signal to the notification device 24. Alternatively, when the minimum value of the cumulative times of placement of workpieces W on the areas 58 reaches or exceeds the predetermined value, the notification controller 26e may inform the operator to accordingly by sending out a control signal to notification device 24.

Though in the first embodiment, the worktable 54 is formed in a rectangular frame-like shape, the worktable 54 may be formed in an L shape. Further, the worktable 54 is not limited to having a hollow portion therein like a frame, but can be formed without any hollow.

Though in the second embodiment, the loads are detected on the top surface 54a of the worktable 54 by the strain gauge 60, a piezoelectric device may be used instead of the strain gauge 60.

In the fourth embodiment, as shown in FIG. 9, the display controller 26d displays the graph three-dimensionally in such a manner that the top face 54a of the worktable 54 is viewed obliquely from an upper point. However, the graph may be formed as a three-dimensional representation viewed from another angle, or may be given as a top view of the top surface 54a of the worktable 54 with multiple colors.

What is claimed is:

1. A wire electrical discharge machine which generates electric discharge at an electrode gap between a wire electrode and a workpiece by applying voltage across the electrode gap to perform electrical discharge machining on the workpiece, comprising:
   a worktable on which the workpiece is placed, wherein the worktable has a top surface;
   a placement area detector configured to divide the top surface of the worktable into a plurality of areas and detect which areas of the plurality of areas in the top surface of the worktable the workpiece is present and which areas of the plurality of areas in the top surface of the worktable the workpiece is not present;
   a placement time measuring unit configured to measure placement time for which the workpiece is placed, on each of the areas detected by the placement area detector; and
   cumulative time storage configured to store an accumulation of the placement times measured by the placement time measuring unit as a cumulative time for the area; and
   a display device that displays a diagram showing the plurality of areas of the top surface of the worktable and the cumulative time for each of the plurality of areas.

2. The wire electrical discharge machine according to claim 1, wherein the display device is configured to display the cumulative times with a graph.

3. The wire electrical discharge machine according to claim 1, further comprising the display device configured to receive a control signal from a display controller to display a distribution of the areas the cumulative time of which with respect to an average of the cumulative times is smaller than a first predetermined ratio.

4. The wire electrical discharge machine according to claim 1, further comprising a notification unit that receives a control signal from a notification controller to notify that the workpiece is placed in an area the cumulative time of which with respect to an average of the cumulative times is larger than a second predetermined ratio when the workpiece is placed in the area the cumulative time of which with respect to the average of the cumulative times is larger than the second predetermined ratio.

5. The wire electrical discharge machine according to claim 1, further comprising a notification unit that receives a control signal from a notification controller to notify that a maximum value, an average value, or a minimum value of the cumulative times becomes equal to or greater than a predetermined value when the maximum value, the average value, or the minimum value of the cumulative times becomes equal to or greater than the predetermined value.

6. The wire electrical discharge machine according to claim 1, wherein the placement time measuring unit is configured to multiply the placement time by a coefficient representative of a state of the wire electrical discharge machine to obtain an effective placement time.

7. The wire electrical discharge machine according to claim 6, wherein:
the worktable is provided inside a work tank in which a working fluid is stored;
when a state in which placement work of the workpiece on the worktable is being performed is named a placement stage,
a state in which the work tank is being filled with the working fluid is named a fluid filling stage,
a state in which the workpiece is being subjected to electrical discharge machining is named a machining stage, and
states in which the working fluid is drained from the work tank and the workpiece is taken out from the worktable are named an unloading stage,
the placement time measuring unit is configured to measure an elapsed time for which the workpiece is being placed on each of the areas detected by the placement area detector, individually in each of the placement stage, the fluid filling stage, the machining stage, and the unloading stage and multiply the measured times for the placement stage, the fluid filling stage, the machining stage, and the unloading stage, separately by a coefficient representative of the respective stages to obtain an effective measured time and accumulates the effective measured times to output a sum as the effective placement time.

8. The wire electrical discharge machine according to claim 1, wherein the placement area detector includes an imaging unit that captures an image of the top surface of the worktable and is configured to detect, from any image captured by the imaging unit, any areas where the workpiece is present.

9. The wire electrical discharge machine according to claim 8, wherein:
the worktable is provided inside a work tank in which a working fluid is stored; and,
the placement time measuring unit is configured to measure the placement time on assumption that the workpiece remains, even while the working fluid is stored in the work tank, in the same areas where the workpiece has been placed right before the working fluid is supplied to the work tank.

10. The wire electrical discharge machine according to claim 1, wherein the placement area detector includes a load sensor that detects a load acting on the top surface of the worktable and is configured to determine, from the loads detected by the load sensor, the areas where the workpiece is present.

11. The wire electrical discharge machine according to claim 1, wherein the placement area detector includes ampere meters that detects electric current flowing through the worktable and is configured to determine, from the currents detected by the ampere meters, the areas where the workpiece is present.

12. A placement time calculation method for calculating cumulative time for which a workpiece is placed on a worktable having a top surface:
a placement area detection step to divide the top surface of the worktable into a plurality of areas and detect which areas of the plurality of areas on the top surface of the worktable the workpiece is present and which areas of the plurality of areas in the top surface of the worktable the workpiece is not present;
a placement time measurement step of measuring placement time for which the workpiece is present on each of the areas detected by the placement area detection step; and,
a cumulative time storing step of accumulating the placement times measured for each area at the placement time measurement step and storing a sum as a cumulative time and
a displaying step of displaying a diagram showing the plurality of areas of the top surface of the worktable and the cumulative time for each of the plurality of areas.

13. The placement time calculation method according to claim 12, wherein the displaying step displays the cumulative times with a graph.

* * * * *